April 28, 1964 C. W. WILDEBOUR 3,131,093

COMBINED CLEANING AND TINNING APPARATUS

Filed Nov. 8, 1961

*INVENTOR.*
CHARLES W. WILDEBOUR

*BY* Ronald L. Juniper

ATTORNEY

United States Patent Office 3,131,093
Patented Apr. 28, 1964

3,131,093

COMBINED CLEANING AND TINNING APPARATUS

Charles W. Wildebour, Seattle, Wash., assignor to The Boeing Company, Seattle, Wash., a corporation of Delaware Filed Nov. 8, 1961, Ser. No. 150,941
6 Claims. (Cl. 118—429)

This invention relates to means for applying solder to articles. More particularly it relates to apparatus for soldering articles wherein separate steps of cleaning and fluxing are eliminated.

Electrical components, such as resistors, are attached to printed circuit cards in large numbers. The leads of such components are soldered to the printed circuitry by flow or dip soldering. Often the tinned component leads as supplied by manufacturers do not solder reliably during assembly to circuit cards. In order to obtain the highest percentage of satisfactory solder joints component leads must be cleaned and retinned just prior to the circuit card assembly. Retinning, as now practiced by assembly shops, requires the following five steps applied to the component leads before soldering the leads to the printed circuits:

(1) Insert in an improved "ink eraser" cleaning machine.

(2) Immerse in a solvent to remove cleaning residue.

(3) Dip in flux.

(4) Dip in flow solder bath.

(5) Dip in solvent and wipe to remove flux residues.

After these preliminary cleaning steps, the leads are dipped in a pot containing molten solder. However, both dross and carbonized flux form on the solder pot which interferes with proper tinning.

From the standpoint of efficiency and the most economical use of manpower, it is apparent that improvements wherein the number of steps or time spent in these preliminary steps can be reduced would be greatly appreciated by industry.

It is the purpose of this invention to provide an apparatus which will eliminate these many time-consuming and costly steps now necessary in order to obtain a high-quality soldered joint.

It is also an object of this invention to provide an apparatus for tinning articles. A related object is to provide an electrical component tinning apparatus which eliminates the need for cleaning and fluxing.

Another object is to provide a means for tinning articles which prepares the articles for coating and coats the article in one operation. A still further object is to provide an apparatus for one step article tinning comprised of a receptacle for receiving the molten tinning substance with abrading particles interspersed therein.

Further objects and advantages will be apparent from the following description.

Figure 1:
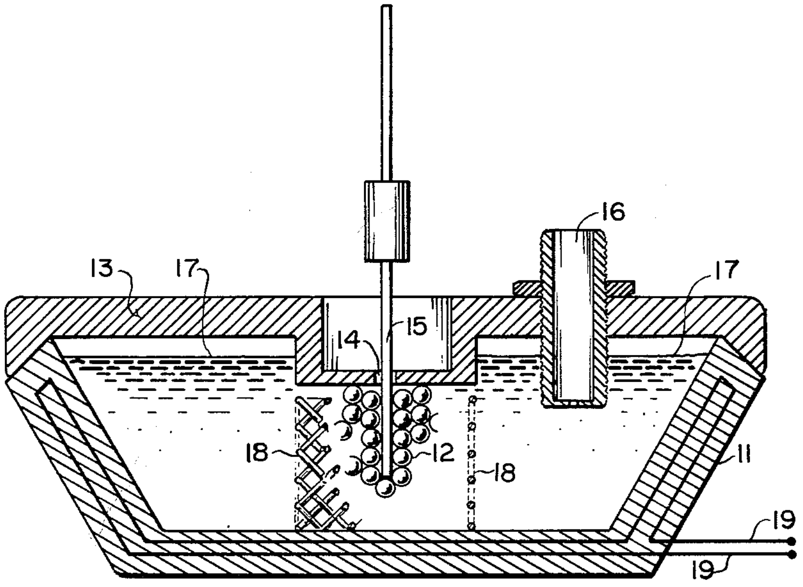
FIGURE 1 shows a cross sectional view of a typical tinning device with an electrical component inserted in the particle-solder mixture. The drawing is not to scale and the disposition of the particles is illustrative only.
Figure 2:
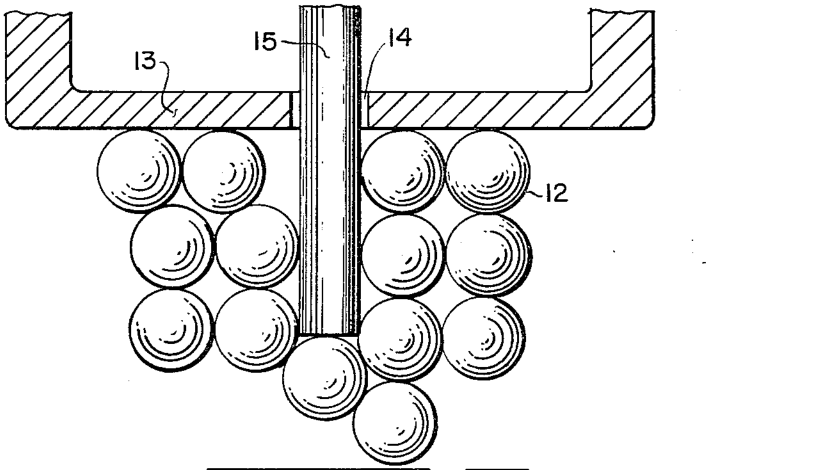
FIGURE 2 is an enlarged cross sectional view of a portion of the tinning device showing in more detail the relationship of the abrading particles to the component being tinned.

In accordance with my invention an apparatus is provided which enables application of solder to articles in one step. A typical soldering device shown in cross-section in FIGURE 1 is comprised of a receptacle 11 for holding a solder-particle mixture. The particles 12 here illustrated are spherical in shape, but not meant to be limited to this particular geometrical configuration. The receptacle 11 has a cover 13 which contains an opening 14 for the purpose of inserting the article 15 which is to be tinned. Also contained in the cover is an adjustable threaded insert 16 which may be removed from a threaded hole in the cover to observe the solder level 17 and to add more solder when necessary. Other refinements of the basic operating apparatus include a thermometer (not illustrated) inserted into the solder-particle mixture to assure a suitable temperature and a retainer for the particles of which a screen type 18 is partially illustrated in FIGURE 1.

The receptacle 11 should have means for being heated to a temperature sufficient to melt and maintain the solder in a suitable operating condition for tinning articles. Though any means sufficient to accomplish this purpose will be satisfactory, a preferred method is by having the heating elements in the form of electrical wiring built into the pot as shown by wires 19 in FIGURE 1. Control of temperature in the solder pot is desirable in order to reduce excess dross formation and to insure uniform results in soldering. Another factor to be kept in mind is that the total volume of the solder in the pot should be adjusted relative to the thermal capacity of the article being tinned. The criterion to consider in this respect, in order to have proper tinning, is that the relative thermal capacities of the solder and the article being soldered should be in such a relationship as to be wetted immediately without a measurable drop in the temperature of the pot. Aside from these factors, which tend to determine the size of the receptacle, it is only necessary that the receptacle be large enough to allow immersion of the largest article desired to be soldered and still effectuate the abrading-soldering process as desired.

In order to obtain continuous metal-to-metal contact in a soldered joint which renders it satisfactory for use as a medium for electrical conduction, it is necessary that the base metals contact without an intervening insulating oxide layer to interrupt the flow of electricity. In the conventional process this non-metallic oxide film, which usually forms, is removed from the surface of the metal by a soldering flux. It is believed that the flux operates by first exerting a slight chemical reducing action on the oxides upon the metal surface which in turn are then coagulated and suspended in the flux, thereby allowing the metal surfaces to contact. Other extraneous matter, such as paints, shellac, and dirt, have to be removed by mechanical or chemical means prior to soldering.

As previously mentioned it is a primary purpose of my invention to accomplish these preliminary cleaning steps in a quicker, more economical manner. In addition, my invention will produce standardized results, not subject to the personal diligence of the respective workers, a very desirable result in today's highly critical requirements in the electronics industry. It should be noted that electrical components will be principally used as examples of the articles where the apparatus and method of my invention may be applied because the problems associated with proper electrical conduction of soldered components has been recently of special importance. However, the utilization of my invention is not meant to be limited to electrical components. In order to more fully appreciate the contribution of my invention to the state of the art I will describe some of the principal operative features.

The basic theory of my invention is that by utilizing abrading particles interspersed in molten solder of sufficient viscosity to compact the particles, cleaning by abrading the particles against the article being tinned, and immediately thereafter, application of the solder without the article being exposed to the contaminating properties of air, the necessity for the separate cleaning steps will be eliminated.

Of primary concern is the operative effect of the particles interspersed in the molten solder. These particles effectuate the cleaning and soldering of the articles desired to be tinned. Hence, the particles necessarily must be carefully selected as to amount, distribution, shape, size and material to obtain the most advantageous results.

In order to better understand the invention it should be noted that there are two separate functions for the abrading particles. One of these functions is acting as a frictional cleaning means. The other function is, in effect, serving as a plurality of small soldering irons to transfer the solder to the article being tinned. Hence, it is readily apparent that materials having properties which will most satisfactorily accomplish both of these functions is the determining criterion for selection of the particles.

The shape and size of the particles, accordingly, should be determined by the relative effectiveness of various characteristics. Upon consideration of this factor it becomes evident that the greatest amount of surface area of the particles that touches the article being tinned is desirable. Also, the particles need to be easily movable against one another so that upon agitation they can clean by frictionally abrading the article which has been inserted in the solder-particle mixture. Accordingly, it is readily apparent why the particles are preferentially spherical. Spherical particles are freely movable and unlikely to become lodged against one another as irregular surfaced particles would have a tendency to do. The movement of spherical particles is only restricted when they become so numerous that they tend to become impacted. This can be easily avoided by limiting the number of the spheres in accordance with the capacity of the receptacle.

Upon returning to consideration of the aspect of the particles wherein the greatest surface area is desired to contact the article being soldered it is apparent that if the particles are of small size they will have less space between contact points and hence, greater surface contacting area. Therefore, in this respect the smallest particles that have sufficient mass to effectively abrade are preferred. However, the size is limited by practical considerations concerning the availability of the particles and the facility with which they may be handled. Also, the particles must not be so small that they have a tendency to be inadvertently removed from the solder by sticking to the article being tinned and pass through the opening in the cover of the apparatus when the article being tinned is removed from the molten particle-solder mixture.

To properly understand the requirements necessary for the constituency of the particles, some knowledge concerning the fundamental nature of solder application is desirable. Soldering is essentially an intermetallic solution action between bare metals. In order to have this solution action take place it is essential that the metal being soldered be as hot as the molten solder. This is easily achieved in my invention since the article being tinned is dipped in the molten solder. However, it is still a desirable characteristics for the particles to be of a material which readily conducts heat since the particles are the principle means by which solder is transferred to the article being tinned.

Ordinarily soldering cannot be done without a flux since this removes the oxide film that forms, insulating the bare metal of the article. In my invention, the article is not exposed to the air in the intervening period between when it is cleaned by abrasion and the bare metal is exposed to the solder. Hence, the oxide layer does not form and flux is not necessary. Also, for effective soldering, the soldering iron is tinned in order to provide a completely metallic surface through which the heat may easily pass and prevent formation of the insulating surface of oxide film. Though once the particles, which perform the function of a soldering iron in my invention, are submerged in the solder there is no problem concerning possible formation of an insulating oxide layer, tests have indicated that by tinning the particles they disperse better in the solder and operate more satisfactorily. Hence, in general, the particles can be made of any metal that can be readily tinned which is not subject to being eventually dissolved in the solder.

The solder preferred to be used in practicing my invention is a 63 percent tin and 37 percent lead mixture. This proportion of these two metals, known as the eutectic composition, has a sharp and distinct melting point of 361° F. which is lower than the melting point of either of the two metals alone. The significance of this eutectic composition is that any other proportion of the metals does not melt sharply but has a temperature range of plasticity requiring a higher temperature to achieve complete liquefaction. However, deviations can be made in practicing my invention from this suggested eutectic composition so long as the basic soldering action is still achieved. Practical considerations of economics and efficiency will ultimately determine the particular solder selected. In any case the basic operation of my invention will still be the same as has been outlined here regardless of the type solder used.

As an example of the manner in which my invention can be practiced, FIGURE 1 shows an apparatus that can be used for this purpose. The general principle of its operation has been previously described in order to elucidate the more detailed operative embodiment which follows, and also to clearly indicate that my invention is not meant to be limited to the particular application described and illustrated as many other embodiments within the true scope of my inventive concept are feasible.

Basically, to practice my invention, the article to which solder is desired to be applied is dipped into a solder-particle mixture in an apparatus as illustrated in FIGURE 1, twisted a sufficient number of times to effectively abrade the article, and removed after it is deemed a sufficient time has elapsed to properly tin the immersed article. As far as the abrading action is concerned it is apparent that any manner in which this can be accomplished without departing from the basic concept of my invention is suitable. Hence, for instance, the receptacle 11 might be agitated sufficiently to effectively abrade articles instead of moving the article within the solder-particle mixture.

Such agitation would preferably be accomplished by vibratory means. By using a magnetically operated apparatus for the vibratory means the need for mechanical devices would be eliminated. In an electrically operated magnetic vibratory device a lower frequency is preferred since a better amplitude for vibration is produced. Hence, for instance, the pulsations can be reduced in half by insertion of a diode to rectify the cycle.

The cover 13 of the apparatus shown is needed to properly retain the particles disposed as desired in the solder since the steel spheres normally used have less density than the solder and have a tendency to float to the top. If a material is used for the particles which has greater density than the solder the cover would no longer be needed for this purpose. In fact granulated tungsten has been tried as the material for the abrading particles since it does have a greater density than the solder, but tests showed that the abrading particles should be tinned in order to better dispose the particles in the solder. Tungsten cannot be tinned so further investigation was made which culminated in the selection of tinned steel shot being selected as the abrasive agency in the illustrated application. However, it is apparent that the means to keep the shot submerged would not be necessary if the shot was heavier than the sholder and also could be tinned or otherwise was deemed satisfactory for transferring the solder to the article being tinned. Also, the fact that only one aperture 14 is illustrated for inserting articles to which solder is desired to be applied does not mean that the inventive concept excludes multiple tinning processes. Another refinement which is partially illustrated in FIGURE 1 is utilizing a screen 18 with mesh smaller than the abrading particles in order to act as an additional retaining means. The main reason for using such a screen is merely so that fewer abrading particles may be used should the heating receptacle available happen to have a substantially larger capacity than that needed to contain a sufficient number of abrading particles to properly apply the device in the particular circumstances desired.

During my experiments I have used spherical steel shot about $\frac{1}{32}$ inch in diameter for the abrading particles. Prior to being used I have found it preferable for the steel shot in my device to be nickel plated before immersion in the solder. The following steps will produce properly plated shot: alkaline clean; cold rinse with water; pickle with hydrochloric acid; cold rinse; add a cyanide neutralizer to prevent immediate rusting; cold rinse; hot rinse; dry; and then apply the nickel plating. This process removes the scale from the steel shot. Also, the nickel plating is a wetting in itself and allows the shot to be tinned with an active non acid flux whereas the chilled steel shot needs an acid flux to tin it. After the nickel plated steel shot are tinned they are deposited in the molten solder. The solder temperature I found satisfactory to maintain during the use of my tinning device has been about 520° F. However, the particular temperature which is suitable varies according to the composition of the solder and other related factors familiar to those who are skilled in the art of soldering.

During the operation of my apparatus using an embodiment as illustrated in FIGURE 1, and incorporating the preferred features previously described, an electrical component such as 15 is tinned by inserting it into the solder-particle mixture, spinning it about 10 turns and then withdrawing the component. When the spinning is done manually I have found that about three or four twists of the component between the fingers will make the desired 10 turns. In other applications of my invention the control means can be mechanized and adaptations for multiple article tinning may be designed without departing from the spirit of the invention.

I claim:

1. Apparatus for immersion soldering comprising a receptacle suitable for retaining solder in a molten state, a cover for the receptacle containing an opening through which parts to be tinned may be inserted, particles immersed in molten solder disposed within the receptacle, said particles being suitable for abrading and transferring solder onto articles inserted into the solder-particle mixture and a container for the particles enclosing a space within the receptacle interior of the opening in the cover thereof, said container being of sufficient porosity to allow the passage of molten solder but not the particles.

2. Apparatus for immersion soldering comprising a receptacle with at least one opening to the exterior thereof which is suitable for retaining solder in a molten state, said receptacle being supplied with means to maintain the inside surface at a temperature sufficient to keep solder disposed within the receptacle in a molten state, particles immersed in molten solder disposed within the receptacle, said particles being of sufficient density and consistency to abrade and transfer solder onto articles inserted into the solder-particle mixture and screened container means to keep said particles sufficiently compacted within the molten solder so as to have abrasive capabilities.

3. Apparatus for immersion soldering comprising a receptacle capable of retaining solder in a molten state, said receptacle being supplied with means to maintain the inside surface at a temperature sufficient to keep solder disposed within the receptacle in a molten state, a cover for the receptacle containing an opening through which parts to be tinned may be inserted, particles immersed in molten solder disposed within the receptacle, said particles being of sufficient density and consistency to abrade and transfer solder onto articles inserted into the solder-particle mixture and screened container means interior of said opening to keep said particles sufficiently compacted within the molten solder so as to have abrasive capabilities.

4. Apparatus for immersion soldering comprising a receptacle with heating means capable of maintaining solder in a molten state, particles immersed in molten solder disposed within the receptacle, said particles having properties satisfactory for abrading and transferring solder onto articles inserted into the solder-particle mixture and screened container means to keep said particles sufficiently compacted within the molten solder so as to have abrasive capabilities.

5. Apparatus for immersion soldering comprising a receptacle with heating means capable of maintaining solder disposed within said receptacle in a molten state, spherical particles immersed in molten solder disposed within the receptacle, said spherical particles being made of a heat conducting material and means to keep said particles sufficiently compacted within the molten solder so as to have abrasive capabilities.

6. Apparatus as in claim 5 wherein the surface of the spherical particles is made of a substance to which molten solder will adhere.

References Cited in the file of this patent

UNITED STATES PATENTS

| | | |
|---|---|---|
| 1,719,512 | Krembs | July 2, 1929 |
| 2,299,689 | Fruth | Oct. 20, 1942 |
| 2,394,545 | Grupe | Feb. 12, 1946 |
| 2,415,683 | Folco | Feb. 11, 1947 |
| 2,762,330 | Whitehead | Sept. 11, 1956 |
| 2,824,543 | Brown | Feb. 25, 1958 |
| 3,093,510 | Olson et al. | June 11, 1963 |

FOREIGN PATENTS

| | | |
|---|---|---|
| 412,989 | Great Britain | July 6, 1934 |
| 290,252 | Great Britain | Aug. 16, 1928 |